United States Patent
Patel et al.

(10) Patent No.: US 8,938,606 B2
(45) Date of Patent: Jan. 20, 2015

(54) SYSTEM, APPARATUS, AND METHOD FOR SEGMENT REGISTER READ AND WRITE REGARDLESS OF PRIVILEGE LEVEL

(75) Inventors: Baiju V. Patel, Portland, OR (US); Gilbert Neiger, Portland, OR (US); Martin G. Dixon, Portland, OR (US); James S. Coke, Haifa (IL); James B. Crossland, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 1034 days.

(21) Appl. No.: 12/976,981

(22) Filed: Dec. 22, 2010

(65) Prior Publication Data

US 2012/0166767 A1  Jun. 28, 2012

(51) Int. Cl.
  *G06F 9/30* (2006.01)
  *G06F 9/34* (2006.01)
(52) U.S. Cl.
  CPC ........ *G06F 9/30032* (2013.01); *G06F 9/30101* (2013.01); *G06F 9/342* (2013.01)
  USPC ........................................ 712/220

(58) Field of Classification Search
  CPC .................. G06F 9/30032; G06F 9/30101
  USPC ............................................ 712/220
  See application file for complete search history.

(56) References Cited

U.S. PATENT DOCUMENTS 6,154,818 A * 11/2000 Christie .................. 711/163
6,507,904 B1 * 1/2003 Ellison et al. ............ 712/229

* cited by examiner

*Primary Examiner* — Andrew Caldwell
*Assistant Examiner* — Benjamin Geib
(74) *Attorney, Agent, or Firm* — Blakely, Sokoloff, Taylor & Zafman LLP

(57) ABSTRACT

Embodiments of systems, apparatuses, and methods for performing privilege agnostic segment base register read or write instruction are described. An exemplary method may include fetching the privilege agnostic segment base register write instruction, wherein the privilege agnostic write instruction includes a 64-bit data source operand, decoding the fetched privilege agnostic segment base register write instruction, and executing the decoded privilege agnostic segment base register write instruction to write the 64-bit data of the source operand into the segment base register identified by the opcode of the privilege agnostic segment base register write instruction.

18 Claims, 9 Drawing Sheets

SYSTEM, APPARATUS, AND METHOD FOR SEGMENT REGISTER READ AND WRITE REGARDLESS OF PRIVILEGE LEVEL

FIELD OF INVENTION

The field of invention relates generally to computer processor architecture, and, more specifically, to instructions which when executed cause a particular result.

BACKGROUND

Many modern processors have different privilege levels that determine what can and cannot be executed by a particular entity. One common view of this divides privilege levels into different rings. As illustrated in FIG. 1, ring 0 is the highest privilege level, and therefore, programs that run in Ring 0 (privilege level 0 or the kernel mode) can do anything with the system, while code that runs in Ring 3 (user mode) has lesser privileges and therefore, is limited in its ability. This separation of privileges protects one ring 3 application from another ring 3 application, and protects ring 0 kernel from ring 3 applications. A ring 3 application should be able to fail at any time without impact to the rest of the computer system because critical tasks that keep computer running are available to ring 0 kernel and not ring 3 applications. Ring 1 and Ring 2 are more restrictive than Ring 0, but less than Ring 3.

These levels provide hardware protection against accidental or deliberate corruption of the system environment (and corresponding breaches of system security) by software. Only "trusted" portions of system software are allowed to execute in the unrestricted environment of kernel mode, and only then when absolutely necessary. All other software executes in one or more user modes.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
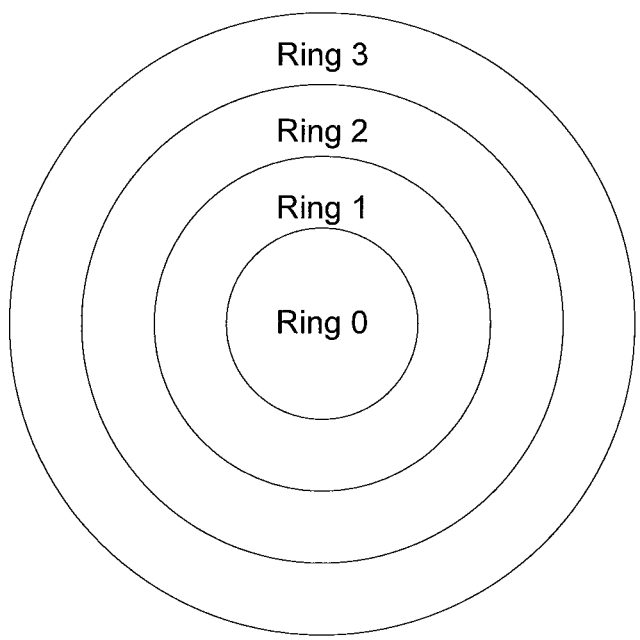
FIG. 1 illustrates a common privilege level architecture.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Today most if not all OSs that support multiple threads of execution in a single address space. The thread specific information in the processor, CPU or a core is called thread context. The operating system is responsible for ensuring that correct thread context is present on a CPU prior to running the thread on that specific CPU. This is commonly referred to as context switch when operating system switches thread context as part of switching from one thread to another. The operating systems also provide some mechanism for providing a thread of execution specific store referred to as a thread specific store. On x86 processors the FS and/or GS segment registers are used to provide access to the thread specific store. By using a segment register each thread can use the same segment and offset when accessing data, yet access set of data that is unique for that thread. This is often the only use of non-zero based non-maximum limit segments in many IA32 and Intel® 64 based operating systems or their equivalents. The segment descriptors are part of the threads context and must be context switched along with the rest of the threads contest. Many operating systems share the same ring 0 or kernel address space among all of threads in a system. These operating systems will often have a different thread specific store for the kernel that they have for ring 3 or user mode. In the kernel the thread specific store will actually be a logical processor specific store and will contain the information that is unique to that processor. These operating systems have to change the segment descriptors on ring transitions as well modify the ones for use in a user code in the context swap code.

When the 64-bit variants of the x86 architecture were introduced (Intel® 64) segmentation was removed from 64-bit mode with the exception of the FS and GS segment registers. The segment descriptors where not enhanced to support the larger address space. They were left as 8 byte descriptors and only support a 32 bit base address. Many operating systems divide the virtual address space with the kernel address space being in the top and the user address space being in the bottom. Additionally, the kernels logical processor specific data needs to be in the kernels address space while the thread specific data needs to be in the users address space. This cannot be accomplished with a 32-bit base address even if the user and kernel address spaces are flipped. To allow these segments to be placed anywhere in the 48 bit virtual address space supported in 64-bit mode requires an alternate mechanism. The mechanism that was implemented was to provide two MSRs, IA32_FS_BASE MSR (C0000100H) and IA32-GS_BASE MSR (C0000101H) that map the base address of the corresponding segments. The base address of the segment can be changed by simply writing these MSRs. RDMSR and WRMSR are privileged instructions, not available for user level code, that allow 64 bits to be written. The SWAPGS instruction also simplifies switching between the kernel mode and user mode GS segment on ring transitions. The instructions RDMSR, WRMSR and SWAPGS are restricted to ring 0 or kernel mode to ensure that ring 3 applications cannot manipulate MSRs which are critical for operation of the entire operating system. The fact that the above instructions are limited to ring 0, this limitation artificially restricts ability of ring 3 application to modify the FS and GS segments. Therefore, for current IA systems, applications are restricted to making a system call or change segment descriptor to switch FS or GS base. System call is slow as it involves a ring transition, and due to the fact that segment descriptors only hold 32-bit segment base (as described earlier), limit the value of these two segment base to lowest 4 GB, a very small fraction of available address space in 64-bit systems, and limits total number of segment descriptors to less than 8K. Traditional x86 processors also included two system table registers Global Descriptor Table Register (GDTR) and Local Descriptor Table Register (LDTR). Both registers stores a 32 or 64-bit linear base address For threads that do only a small amount of work between contexts switches, the system call, context switch and subsequent return to the user mode code is often the major part of the work done by the thread each time it runs. One possible solution to this problem is user mode threads where the context switch between threads is done in the user mode code. Each of these user mode threads needs its own unique copy of a thread specific store. Without their own unique copy the user mode threads have to be restricted to a single OS thread (the thread specific store will not follow them when they move between OS threads) and even then there are issues with multiple entities that are unaware of each other using the same store.

Switching from "user mode" to "kernel mode" is, in most existing systems, very expensive. As such, the above described way of reading and writing from/to the segment registers is than ideal. Detailed below, are embodiments of systems, architectures, etc. that may be used to execute instructions for reading and writing from a segment base register such as IA32_GS_BASE or IA32_FS_BASE regardless of the current privilege level in 64-bit mode. These instructions may be a part of a privilege level 3 program.

An example of a privilege agnostic write instruction is "WRGSBASE RAX," where "RAX" a register or memory operand that contains a 64-bit data value to be written to the GS segment base register. WRGSBASE is the opcode and identifies the IA32_GS_BASE register. The execution of this instruction=writes the RAX register's data into the GS segment base register. Similarly, WRFSBASE RAX is an instruction which when executed writes to the FS segment register (IA32_FS_BASE) the data of RAX.

An example of a privilege agnostic read instruction is "RDGSBASE RAX," where "RAX" a register or memory operand that will store 64-bit data read from the GS segment base register. RDGSBASE is the opcode and identifies the IA32_GS_BASE register. The execution of this instruction cases a read of the GS segment base register's values into the RAX register. Similarly, RDFSBASE RAX is an instruction which when executed reads from the FS segment base register (IA32_FS_BASE) its data and causes it to be stored in RAX.

Figure 2:
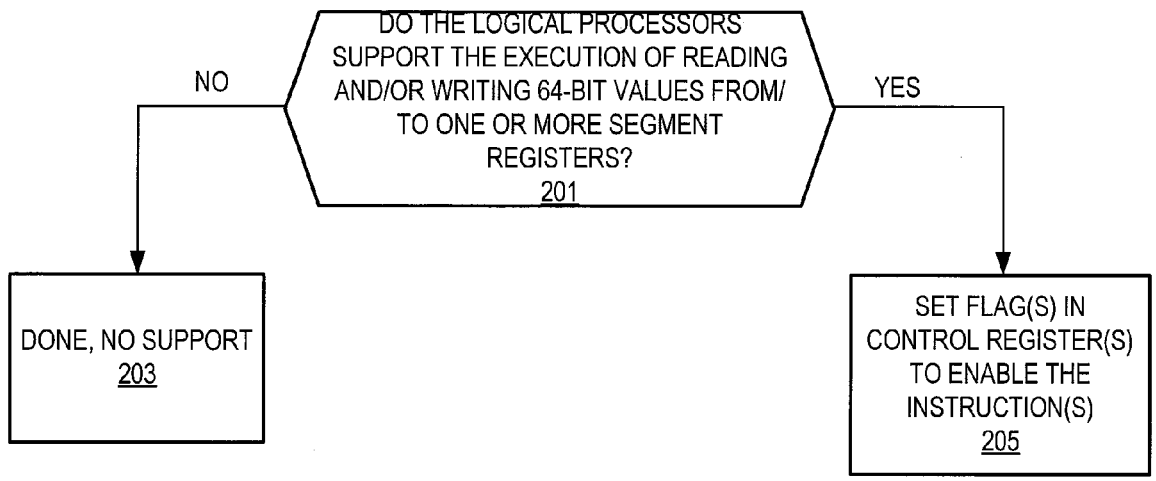
FIG. 2 illustrates an embodiment of a method of setting a support indication.

In some embodiments, prior to the execution of a privilege agnostic segment base register read/write instruction, one of the operating system, processor, or chipset sets an indication that the processor can support such an instruction. An embodiment of a method of setting this indication is illustrated in FIG. 2.

A determination of if the logical processors of the processor support the execution of reading and/or writing 64-bit values from/to one or more of the processors segment base registers regardless of privilege level is made at 201. Typically, this determination is done by checking a CPUID feature flag of the processor which indicates that there is support.

If there is not support, then the less efficient means of reading/writing from/to segment base registers is used at 203. If there is support, then at least one flag is set in a control register indicating support for these types of instructions. For example, in some embodiments control register 4 has a flag that is set for this indication. Of course, other registers may also be used for this purpose.

Figure 3:
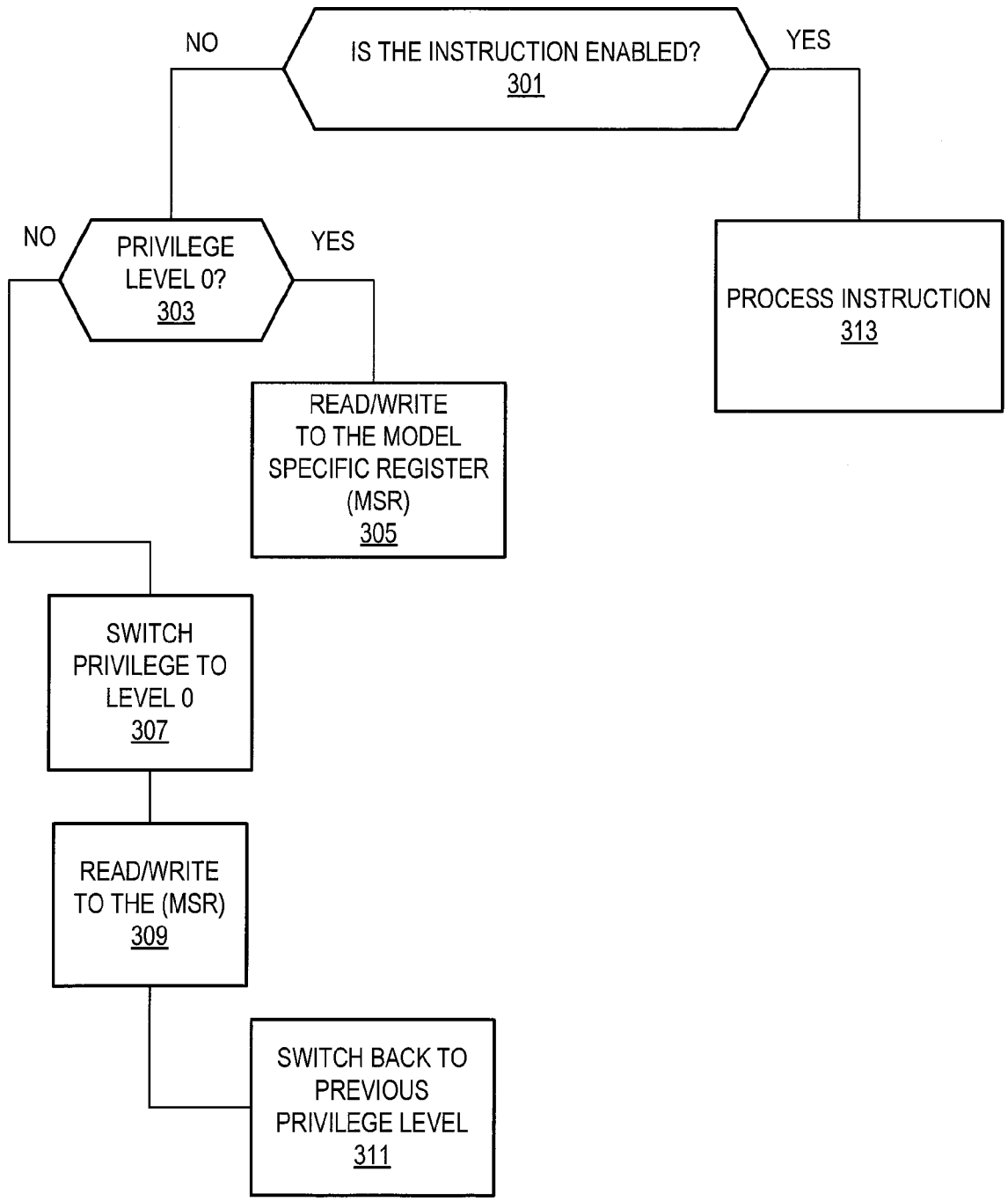
FIG. 3 illustrates an embodiment of a method of segment base register reading/writing.

FIG. 3 illustrates an embodiment of a method of segment base register reading/writing. At 301, a determination is made of if the privilege agnostic segment base register read/write instruction(s) is enabled at 301. For example, if a control register such as control register 4 in the x86 architecture is used, the corresponding flag is checked to see what is supported. If a privilege agnostic segment base register read/write instruction is supported, then these instructions will be processed as they are fetched, etc. at 313.

If the privilege agnostic segment base register read/write instruction(s) is not supported, a determination if privilege level the logical processor is in privilege level 0 is made at 303. As detailed above, privilege level 0 means that there are few, if any, restrictions on what can be run. If this is the privilege level, the GS and FS base addresses may be updated in 64-bit mode by reading writing from/to either the IA32_GS_BASE or the IA32_FS_BASE using the respective RDMSR or WRMSR privileged instruction at 305.

If the privilege level is higher than 0, then a switch to privilege level 0 occurs at 307. Once in privilege level 0, the GS and FS base addresses may be updated in 64-bit mode by reading/writing from/to either the IA32_GS_BASE or the IA32_FS_BASE using the respective RDMSR or WRMSR privileged instruction at 309. After this action has occurred, a switch back to the previous privilege level is made at 311. Of course, this adds an underlined performance penalty.

Figure 4:
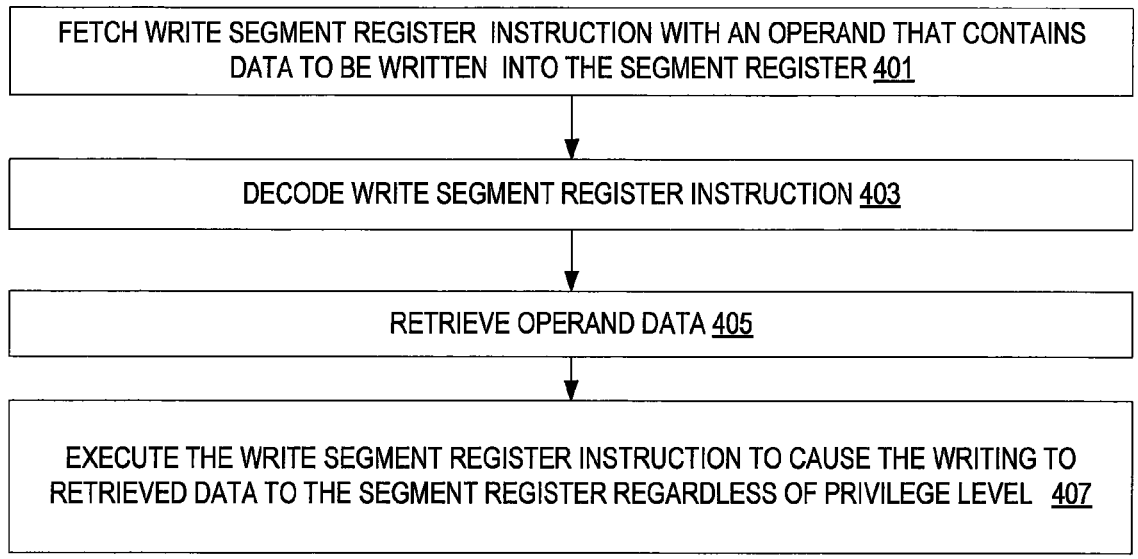
FIG. 4 illustrates an embodiment of a method of handling a privilege agnostic segment base register write instruction.

FIG. 4 illustrates an embodiment of a method of handling a privilege agnostic segment base register write instruction. Prior to any of the steps of this exemplary method, there may have been a determination that the instruction is supported. At 401, the privilege agnostic segment base register write instruction is received at 401. This instruction includes an operand that includes 64-bit data to be written into the segment base register (e.g., either IA32_GS_BASE or IA32_FS_BASE). This operand may be a memory location or a register, but is more typically a register.

The privilege agnostic segment base register write instruction is decoded by decoding logic at 403 and the operand data retrieved at 405. For example, data from a register is retrieved if the operand is a register such as RAX.

The privilege agnostic segment base register write instruction is executed at 407 to cause the writing of the retrieved data to the appropriate segment base register regardless of the current privilege level.

Figure 5:
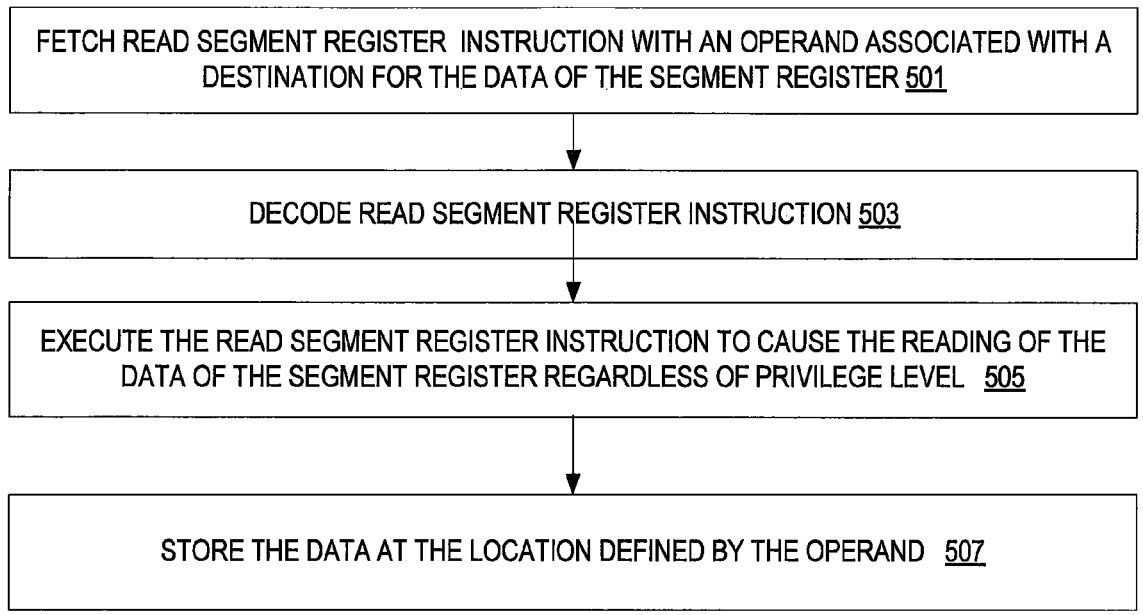
FIG. 5 illustrates an embodiment of a method of handling a privilege agnostic segment base register read instruction.

FIG. 5 illustrates an embodiment of a method of handling a privilege agnostic segment base register read instruction. Prior to any of the steps of this exemplary method, there has been a determination that the instruction is supported. At 501, the privilege agnostic segment register read instruction is received at 501. This instruction includes an operand identifying a location to store 64-bit data read from the segment MSR (e.g., either IA32_GS_BASE or IA32_FS_BASE). This operand may be a memory location or a register.

The privilege agnostic segment base register read instruction is decoded by decoding logic at 503. For example, data from a register is retrieved if the operand is a register such as RAX.

The privilege agnostic segment base register read instruction is executed at 505 to cause the reading of the data of the appropriate base register regardless of privilege level. The data is then stored at the location defined by the operand at 507.

Exemplary Computer Systems and Processors

Figure 6:
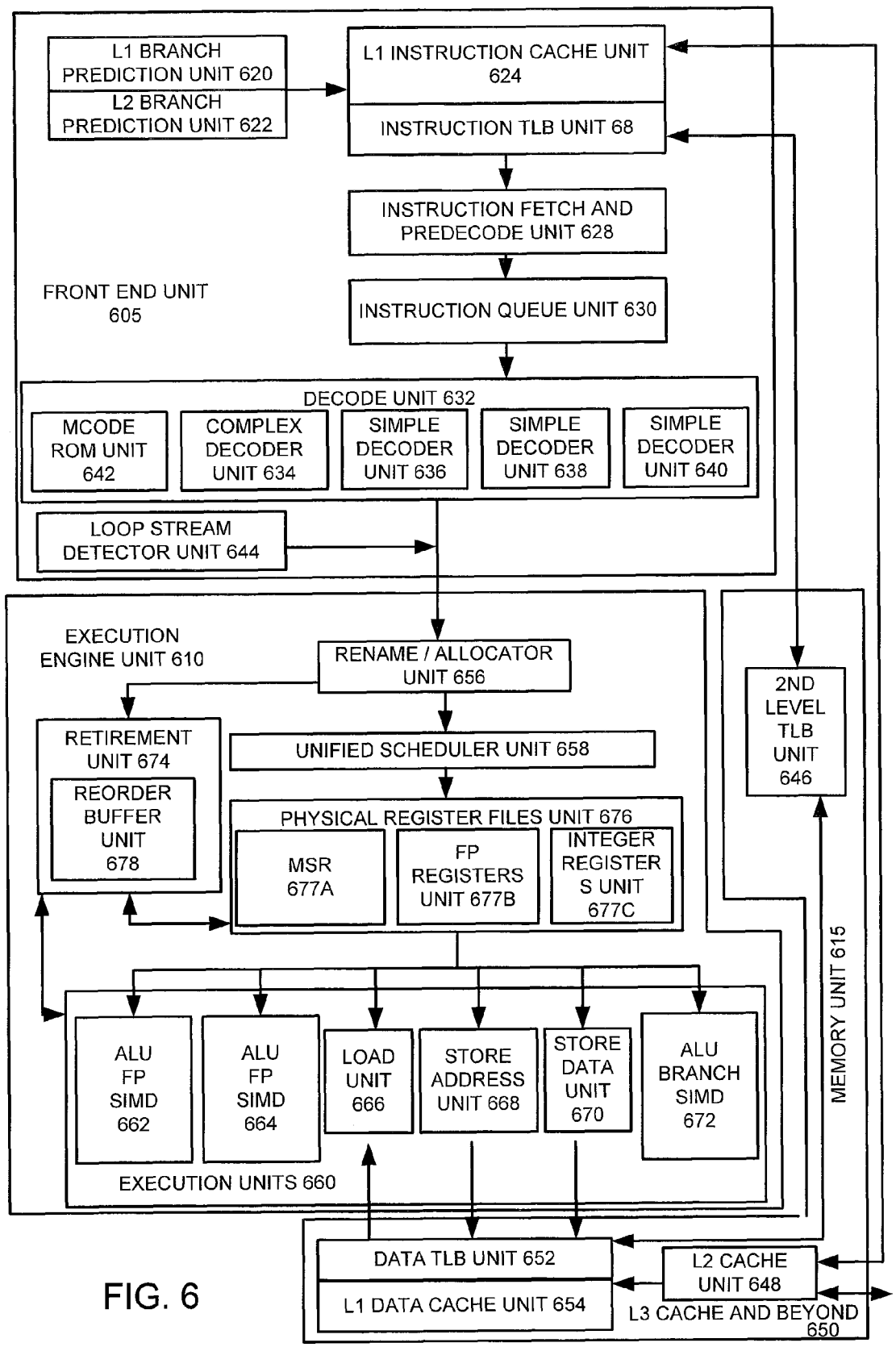
FIG. 6 is a block diagram illustrating an exemplary out-of-order architecture of a core according to embodiments of the invention.

Embodiments of apparatuses and systems capable of executing the above instructions are detailed below. FIG. 6 is a block diagram illustrating an exemplary out-of-order architecture of a core according to embodiments of the invention. However, the instructions above may be executed in an in-order architecture too. In FIG. 6, arrows denote a coupling between two or more units and the direction of the arrow indicates a direction of data flow between those units. Components of this architecture may be used to process the instructions detailed above including the fetching, decoding, and execution of these instructions.

FIG. 6 includes a front end unit 605 coupled to an execution engine unit 610 and a memory unit 615; the execution engine unit 610 is further coupled to the memory unit 615.

The front end unit 605 includes a level 1 (L1) branch prediction unit 620 coupled to a level 2 (L2) branch prediction unit 622. These units allow a core to fetch and execute instructions without waiting for a branch to be resolved. The L1 and L2 brand prediction units 620 and 622 are coupled to an L1 instruction cache unit 624. L1 instruction cache unit 624 holds instructions or one or more threads to be potentially be executed by the execution engine unite 610.

The L1 instruction cache unit 624 is coupled to an instruction translation lookaside buffer (ITLB) 626. The ITLB 626 is coupled to an instruction fetch and predecode unit 628 which splits the bytestream into discrete instructions.

The instruction fetch and predecode unit 628 is coupled to an instruction queue unit 630 to store these instructions. A decode unit 632 decodes the queued instructions including the instructions described above. In some embodiments, the decode unit 632 comprises a complex decoder unit 634 and three simple decoder units 636, 638, and 640. A simple decoder can handle most, if not all, x86 instruction which decodes into a single uop. The complex decoder can decode instructions which map to multiple uops. The decode unit 632 may also include a micro-code ROM unit 642.

The L1 instruction cache unit 624 is further coupled to an L2 cache unit 648 in the memory unit 615. The instruction TLB unit 626 is further coupled to a second level TLB unit 646 in the memory unit 615. The decode unit 632, the micro-code ROM unit 642, and a loop stream detector (LSD) unit 644 are each coupled to a rename/allocator unit 656 in the execution engine unit 610. The LSD unit 644 detects when a loop in software is executed, stop predicting branches (and potentially incorrectly predicting the last branch of the loop), and stream instructions out of it. In some embodiments, the LSD 644 caches micro-ops.

The execution engine unit 610 includes the rename/allocator unit 656 that is coupled to a retirement unit 674 and a unified scheduler unit 658. The rename/allocator unit 656 determines the resources required prior to any register renaming and assigns available resources for execution. This unit also renames logical registers to the physical registers of the physical register file.

The retirement unit 674 is further coupled to execution units 660 and includes a reorder buffer unit 678. This unit retires instructions after their completion.

The unified scheduler unit 658 is further coupled to a physical register files unit 676 which is coupled to the execution units 660. This scheduler is shared between different threads that are running on the processor.

The physical register files unit 676 comprises a MSR unit 677A, a floating point registers unit 677B, and an integers registers unit 677C and may include additional register files not shown (e.g., the scalar floating point stack register file 545 aliased on the MMX packed integer flat register file 550). The MSR unit includes the IA32_GS_BASE and IA32_FS_BASE registers.

The execution units 660 include three mixed scalar and SIMD execution units 662, 664, and 672; a load unit 666; a store address unit 668; a store data unit 670. The load unit 666, the store address unit 668, and the store data unit 670 perform load/store and memory operations and are each coupled further to a data TLB unit 652 in the memory unit 615.

The memory unit 615 includes the second level TLB unit 646 which is coupled to the data TLB unit 652. The data TLB unit 652 is coupled to an L1 data cache unit 654. The L1 data cache unit 654 is further coupled to an L2 cache unit 648. In some embodiments, the L2 cache unit 648 is further coupled to L3 and higher cache units 650 inside and/or outside of the memory unit 615.

The following are exemplary systems suitable for executing the instruction(s) detailed herein. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
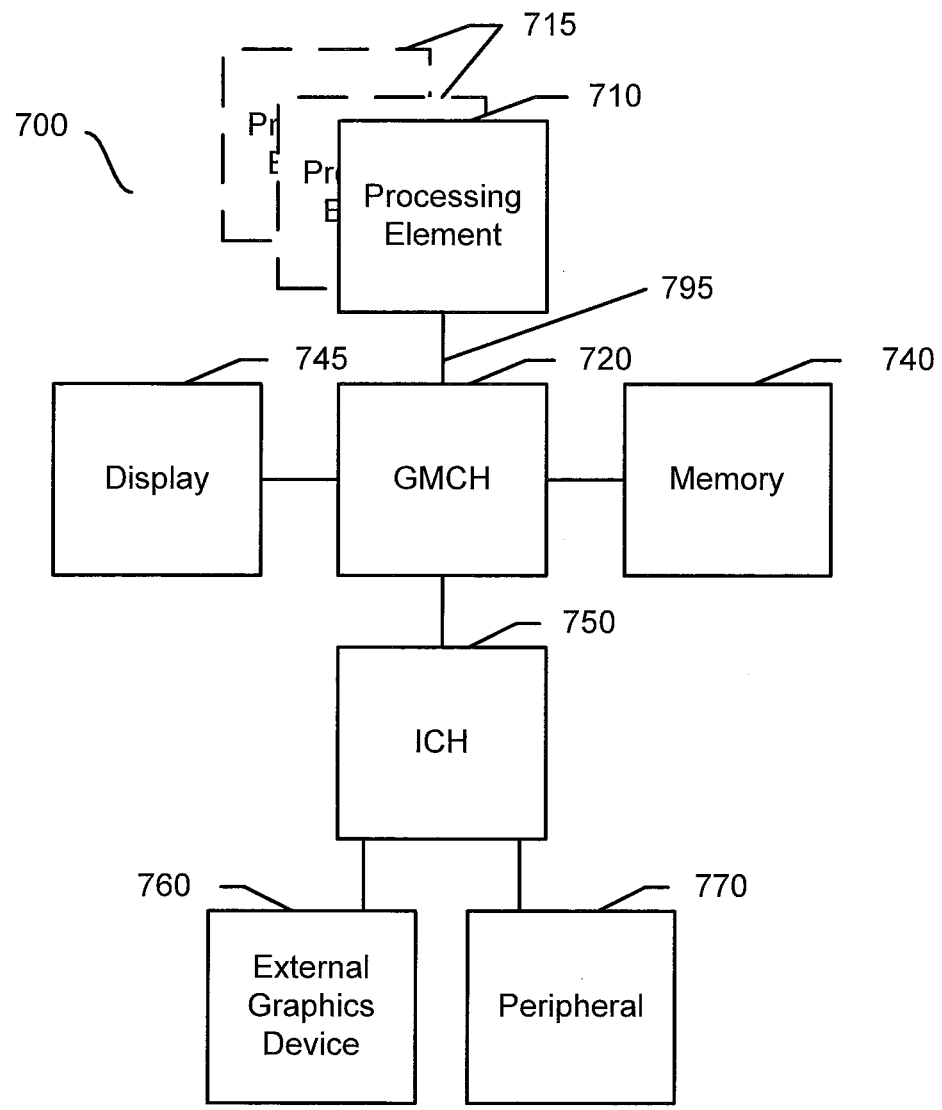
FIG. 7 shows a block diagram of a system in accordance with one embodiment of the present invention.

Referring now to FIG. 7, shown is a block diagram of a system 700 in accordance with one embodiment of the present invention. The system 700 may include one or more processing elements 710, 715, which are coupled to graphics memory controller hub (GMCH) 720. The optional nature of additional processing elements 715 is denoted in FIG. 7 with broken lines.

Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multi-threaded in that they may include more than one hardware thread context per core.

FIG. 7 illustrates that the GMCH 720 may be coupled to a memory 740 that may be, for example, a dynamic random access memory (DRAM). The DRAM may, for at least one embodiment, be associated with a non-volatile cache.

The GMCH 720 may be a chipset, or a portion of a chipset. The GMCH 720 may communicate with the processor(s) 710, 715 and control interaction between the processor(s) 710, 715 and memory 740. The GMCH 720 may also act as an accelerated bus interface between the processor(s) 710, 715 and other elements of the system 700. For at least one embodiment, the GMCH 720 communicates with the processor(s) 710, 715 via a multi-drop bus, such as a frontside bus (FSB) 795.

Furthermore, GMCH 720 is coupled to a display 745 (such as a flat panel display). GMCH 720 may include an integrated graphics accelerator. GMCH 720 is further coupled to an input/output (I/O) controller hub (ICH) 750, which may be used to couple various peripheral devices to system 700.

Shown for example in the embodiment of FIG. 7 is an external graphics device 760, which may be a discrete graphics device coupled to ICH 750, along with another peripheral device 770.

Alternatively, additional or different processing elements may also be present in the system 700. For example, additional processing element(s) 715 may include additional processors(s) that are the same as processor 710, additional processor(s) that are heterogeneous or asymmetric to processor 710, accelerators (such as, e.g., graphics accelerators or digital signal processing (DSP) units), field programmable gate arrays, or any other processing element. There can be a variety of differences between the physical resources 710, 715 in terms of a spectrum of metrics of merit including architectural, microarchitectural, thermal, power consumption characteristics, and the like. These differences may effectively manifest themselves as asymmetry and heterogeneity amongst the processing elements 710, 715. For at least one embodiment, the various processing elements 710, 715 may reside in the same die package.

Figure 8:
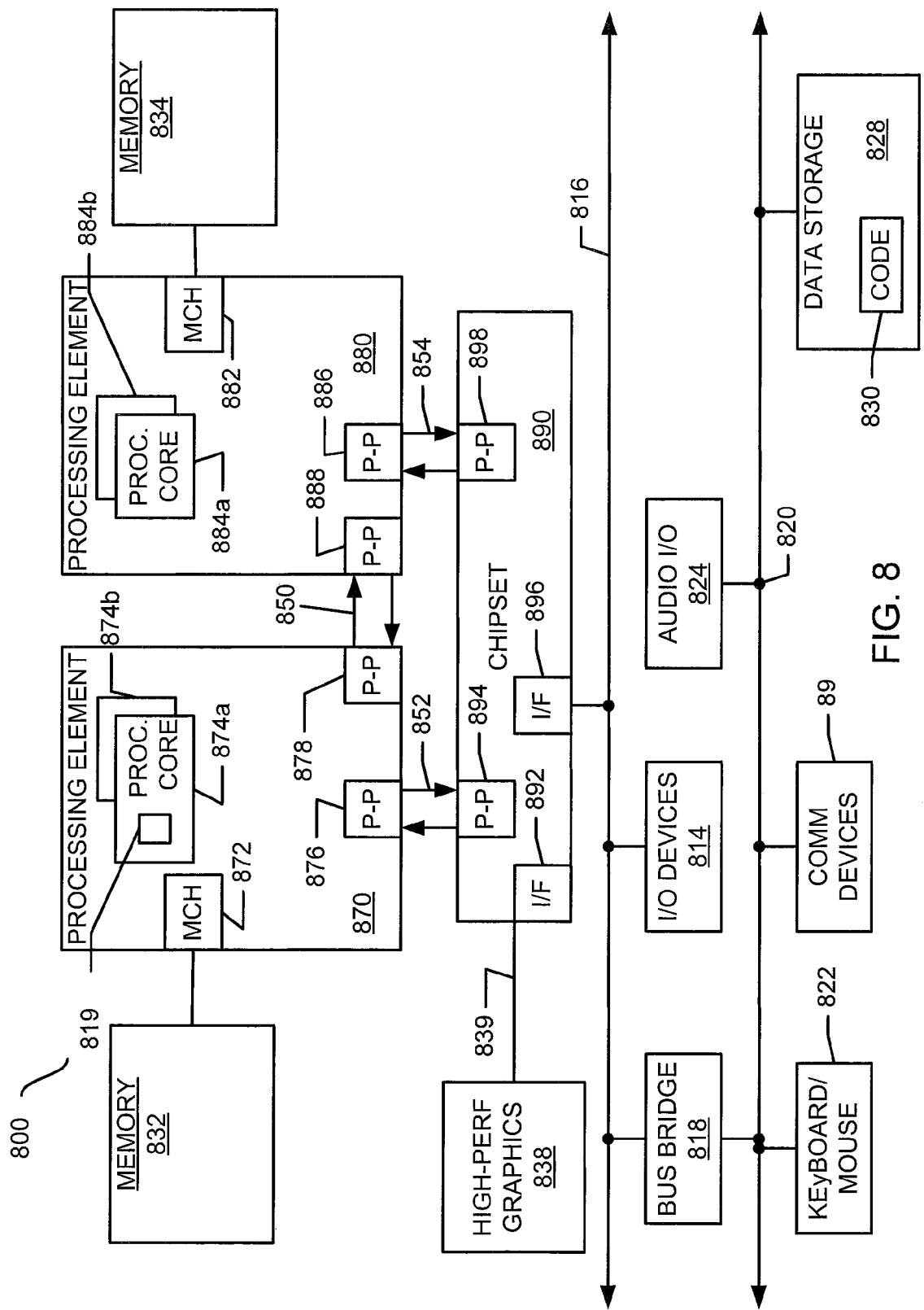
FIG. 8 shows a block diagram of a second system in accordance with an embodiment of the present invention.

Referring now to FIG. 8, shown is a block diagram of a second system 800 in accordance with an embodiment of the present invention. As shown in FIG. 8, multiprocessor system 800 is a point-to-point interconnect system, and includes a first processing element 870 and a second processing element 880 coupled via a point-to-point interconnect 850. As shown in FIG. 8, each of processing elements 870 and 880 may be multicore processors, including first and second processor cores (i.e., processor cores 874a and 874b and processor cores 884a and 884b).

Alternatively, one or more of processing elements 870, 880 may be an element other than a processor, such as an accelerator or a field programmable gate array.

While shown with only two processing elements 870, 880, it is to be understood that the scope of the present invention is not so limited. In other embodiments, one or more additional processing elements may be present in a given processor.

First processing element 870 may further include a memory controller hub (MCH) 872 and point-to-point (P-P) interfaces 876 and 878. Similarly, second processing element 880 may include a MCH 882 and P-P interfaces 886 and 888. Processors 870, 880 may exchange data via a point-to-point (PtP) interface 850 using PtP interface circuits 878, 888. As shown in FIG. 8, MCH's 872 and 882 couple the processors to respective memories, namely a memory 842 and a memory 844, which may be portions of main memory locally attached to the respective processors.

Processors 870, 880 may each exchange data with a chipset 890 via individual PtP interfaces 852, 854 using point to point interface circuits 876, 894, 886, 898. Chipset 890 may also exchange data with a high-performance graphics circuit 838 via a high-performance graphics interface 839. Embodiments of the invention may be located within any processor having any number of processing cores, or within each of the PtP bus agents of FIG. 8. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode.

First processing element 870 and second processing element 880 may be coupled to a chipset 890 via P-P interconnects 876, 886 and 884, respectively. As shown in FIG. 8, chipset 890 includes P-P interfaces 894 and 898. Furthermore, chipset 890 includes an interface 892 to couple chipset 890 with a high performance graphics engine 848. In one embodiment, bus 849 may be used to couple graphics engine 848 to chipset 890. Alternately, a point-to-point interconnect 849 may couple these components.

In turn, chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
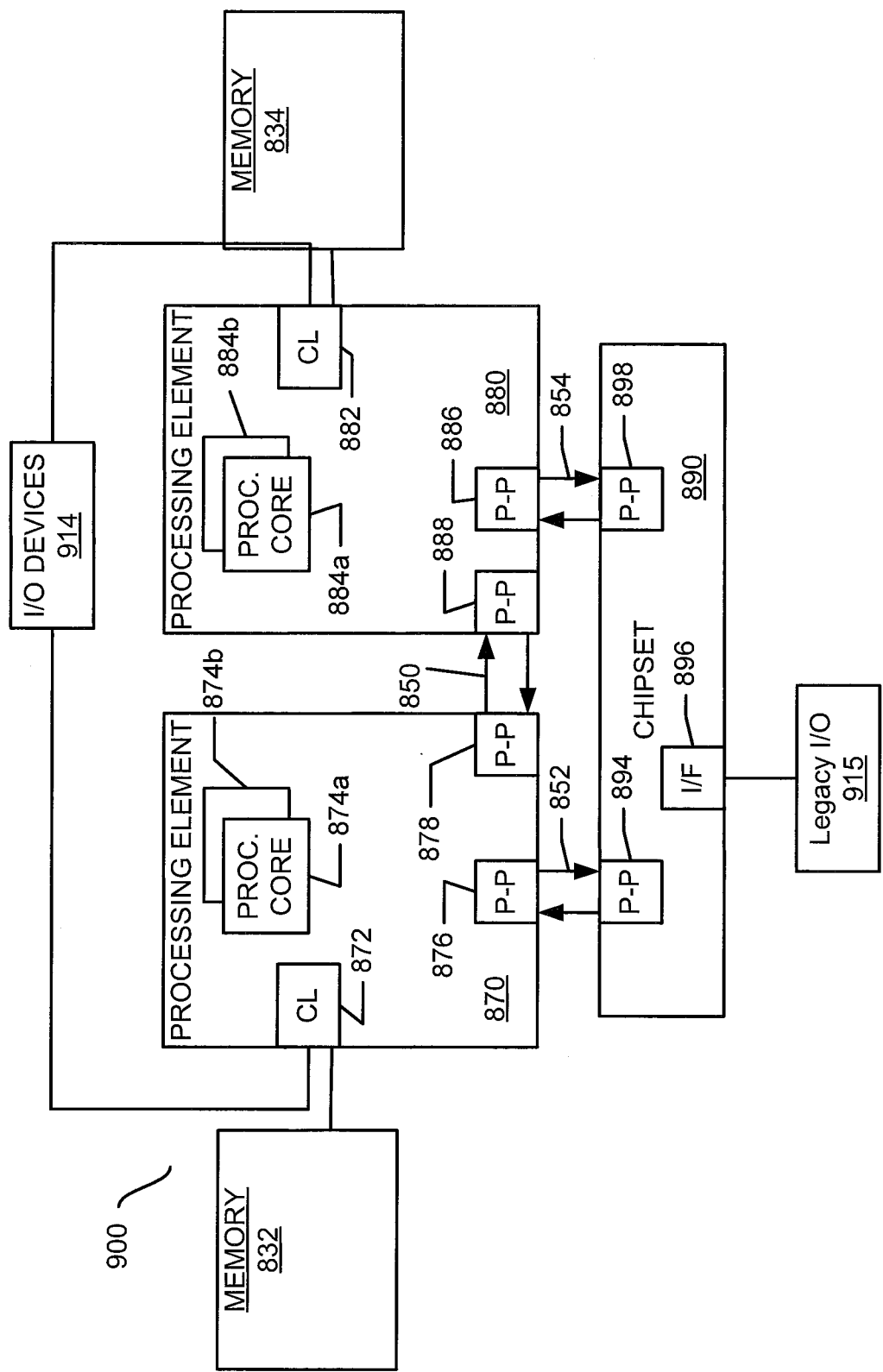
FIG. 9 shows a block diagram of a third system in accordance with an embodiment of the present invention.

Referring now to FIG. 9, shown is a block diagram of a third system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processing elements 870, 880 may include integrated memory and I/O control logic ("CL") 872 and 882, respectively. For at least one embodiment, the CL 872, 882 may include memory controller hub logic (MCH) such as that described above in connection with FIGS. 7 and 8. In addition, CL 872, 882 may also include I/O control logic. FIG. 9 illustrates that not only are the memories 842, 844 coupled to the CL 872, 882, but also that I/O devices 914 are also coupled to the control logic 872, 882. Legacy I/O devices 915 are coupled to the chipset 890.

Embodiments of the mechanisms disclosed herein may be implemented in hardware, software, firmware, or a combination of such implementation approaches. Embodiments of the invention may be implemented as computer programs or program code executing on programmable systems comprising at least one processor, a data storage system (including volatile and non-volatile memory and/or storage elements), at least one input device, and at least one output device.

Program code, such as code 830 illustrated in FIG. 8, may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as HDL, which defines structures, circuits, apparatuses, processors and/or system features described herein. Such embodiments may also be referred to as program products.

Certain operations of the instruction(s) disclosed herein may be performed by hardware components and may be embodied in machine-executable instructions that are used to cause, or at least result in, a circuit or other hardware component programmed with the instructions performing the operations. The circuit may include a general-purpose or special-purpose processor, or logic circuit, to name just a few examples. The operations may also optionally be performed by a combination of hardware and software. Execution logic and/or a processor may include specific or particular circuitry or other logic responsive to a machine instruction or one or more control signals derived from the machine instruction to store an instruction specified result operand. For example, embodiments of the instruction(s) disclosed herein may be executed in one or more the systems of FIGS. 7, 8, and 9 and embodiments of the instruction(s) may be stored in program code to be executed in the systems.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents. For example, one or more operations of a method may be combined or further broken apart.

Alternative Embodiments

While embodiments have been described which would natively execute the instructions described herein, alternative embodiments of the invention may execute the instructions through an emulation layer running on a processor that executes a different instruction set (e.g., a processor that executes the MIPS instruction set of MIPS Technologies of Sunnyvale, Calif., a processor that executes the ARM instruction set of ARM Holdings of Sunnyvale, Calif.). Also, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

What is claimed is:

1. A method of performing privilege agnostic segment base register write instruction in a computer processor, comprising:
    fetching the privilege agnostic segment base register write instruction, wherein the privilege agnostic segment base register write instruction includes a 64-bit data source operand;
    decoding the fetched privilege agnostic segment base register write instruction;
    executing the decoded privilege agnostic segment base register write instruction to write the 64-bit data of the source operand into the segment base register identified by the opcode of the privilege agnostic segment base register write instruction.

2. The method of claim 1, wherein the segment base register is IA32_FS_BASE.

3. The method of claim 1, wherein the segment base register is IA32_GS_BASE.

4. The method of claim 1, wherein the privilege agnostic segment base register write instruction is a part of a privilege level 3 program.

5. The method of claim 1, further comprising:
    determining that the computer processor can support the privilege agnostic segment base register write instruction by checking a CPUID feature flag of the processor.

6. The method of claim 5, further comprising:
    setting a flag in the computer processor indicating support for the privilege agnostic segment base register write instruction.

7. The method of claim 1, further comprising:
    determining that the computer processor cannot support the privilege agnostic segment base register write instruction by checking a CPUID feature flag of the processor; and
    setting a flag in the computer processor indicating no support for the privilege agnostic segment base register write instruction.

8. A method of performing privilege agnostic segment base register read instruction in a computer processor, comprising:
    fetching the privilege agnostic segment base register read instruction, wherein the privilege agnostic segment base register read instruction includes a 64-bit data destination operand;
    decoding the fetched privilege agnostic segment base register read instruction;
    executing the decoded privilege agnostic segment base register read instruction to read the 64-bit data of the segment base register identified by the opcode of the privilege agnostic segment base register read instruction and store that 64-bit data into the location identified by the 64-bit data destination operand.

9. The method of claim 8, wherein the segment base register is IA32_FS_BASE.

10. The method of claim 8, wherein the segment base register is IA32_GS_BASE.

11. The method of claim 8, wherein the privilege agnostic segment base register read instruction is a part of a privilege level 3 program.

12. The method of claim 8, further comprising:
determining that the computer processor can support the privilege agnostic segment base register read instruction by checking a CPUID feature flag of the processor.

13. The method of claim 12, further comprising:
setting a flag in the computer processor indicating support for the privilege agnostic segment base register read instruction.

14. The method of claim of claim 1, further comprising:
determining that the computer processor cannot support the privilege agnostic segment base register read instruction by checking a CPUID feature flag of the processor; and
setting a flag in the computer processor indicating no support for the privilege agnostic segment base register read instruction.

15. An hardware apparatus comprising:
an instruction set including a privilege agnostic segment base register write instruction and a privilege agnostic segment base register read instruction;
fetch logic to fetch a privilege agnostic segment base register write instruction, wherein the privilege agnostic segment base register write instruction includes a 64-bit data source operand;
decode logic to decode the fetched privilege agnostic segment base register write instruction;
execution logic to execute the decoded privilege agnostic segment base register write instruction to write the 64-bit data of the source operand into the segment base register identified by the opcode of the privilege agnostic segment base register write instruction.

16. The apparatus of claim 15, wherein:
the fetch logic to fetch a privilege agnostic segment base register read instruction, wherein the privilege agnostic segment base register read instruction includes a 64-bit data destination operand;
the decode logic to decode the fetched privilege agnostic segment base register read instruction;
the execution logic to execute the decoded privilege agnostic segment base register read instruction to read the 64-bit data of the segment base register identified by the opcode of the privilege agnostic segment base register read instruction and store that 64-bit data into the location identified by the 64-bit data destination operand.

17. The apparatus of claim 16, wherein the segment base register is IA32_FS_BASE.

18. The apparatus of claim 16, wherein the segment base register is IA32_GS_BASE.

* * * * *